(12) United States Patent
Singh

(10) Patent No.: US 8,456,469 B2
(45) Date of Patent: Jun. 4, 2013

(54) 3D RECONSTRUCTION FROM OVERSAMPLED 2D PROJECTIONS

(76) Inventor: Satpal Singh, Potomac, MD (US)

( * ) Notice: Subject to any disclaimer, the term of this patent is extended or adjusted under 35 U.S.C. 154(b) by 783 days.

(21) Appl. No.: 12/634,863

(22) Filed: Dec. 10, 2009

(65) Prior Publication Data

US 2011/0141111 A1 Jun. 16, 2011

(51) Int. Cl.
*G06T 17/00* (2006.01)
(52) U.S. Cl.
USPC ........... 345/424; 345/419; 345/420; 345/427; 382/128; 382/131
(58) Field of Classification Search
USPC ................ 345/419, 424, 427, 420; 378/19, 378/57, 901; 382/131, 128
See application file for complete search history.

(56) References Cited

U.S. PATENT DOCUMENTS

| | | | |
|---|---|---|---|
| 5,889,833 A * | 3/1999 | Silver | 378/15 |
| 7,466,790 B2 * | 12/2008 | Suryanarayanan et al. | 378/4 |
| 7,804,988 B2 * | 9/2010 | Flohr et al. | 382/128 |
| 8,135,186 B2 * | 3/2012 | Bouman et al. | 382/128 |
| 2005/0151736 A1 * | 7/2005 | Schlegel et al. | 345/424 |
| 2010/0150421 A1 * | 6/2010 | Nakanishi et al. | 382/131 |

* cited by examiner

*Primary Examiner* — Kimbinh T Nguyen

(57) ABSTRACT

A method is presented for generating a 3D image of an object using x-rays. The invention describes a method of generating an image of a slice through the object using a large number of detector elements as employed in commonly used x-ray scanners. The method described is a two step process, in the first step, Algebraic methods are used to solve a set of simultaneous linear equations to solve for the densities of the pixels representing the slice. The dimension of these pixels defining the slice is large in comparison to the size of detector elements, therefore a second step of backprojection is used to generated a slice image of higher resolution. The use of a second or a third source further allows the generation of higher resolution images.

6 Claims, 8 Drawing Sheets

3D RECONSTRUCTION FROM OVERSAMPLED 2D PROJECTIONS

BACKGROUND OF THE INVENTION

1. Field of the Invention

This invention describes a 3D x-ray imaging system using the methods of image reconstruction for applications in security screening of baggage or cargo, and medical imaging.

2. Description of the Related Art 2D x-ray imaging is widely used both in the areas of medicine, and security screening of baggage and cargo. 2D imaging has its limitations and therefore Computed Axial Tomographic (CAT) or simply Computed Tomographic (CT) systems are used in the field of medicine and also for screening of baggage to detect for explosives, objects of threat and contraband.

While CT systems have been employed usefully in the field of medicine, they expose the patient to x-ray dose which is 100 times or more than that of an ordinary x-ray image. Further, these systems are very costly, in the vicinity of a million dollars or more. In the field of security screening, the CT systems are effective in checking for explosives, but are very expensive, slow, large, and cannot be made large enough to screen larger air cargo or shipping containers.

CAT systems employ a complex rotating gantry which makes the system costly, large, and power hungry. In order to do away with the rotating gantry, there has been effort to generate 3D images using the methods which are referred to as Tomosynthesis or Tomography. Such methods use only a few views or projections compared to a few hundreds used by CAT systems. However, these methods are still in the research and design phase.

Accordingly, the objects of this invention are to overcome the above limitations as stated next.

OBJECTS OF THE INVENTION

It is, accordingly, an object of the invention to provide a fast method of inspecting 3D volume of a scanned object or baggage, for example as required for the detection of explosives or contraband.

It is also an object of the invention that the system be scalable to scan large objects such as shipping containers.

It is also an object of this invention to keep the system low cost, low complexity so that the maintenance is low, small size and low power relative to CAT systems.

It is also an object of the system to use minimal number of views or projections so that the exposure to x-ray radiation is minimized, this is extremely desirable in the field of medicine.

It is also an object of the invention to provide for a low cost 3D imaging system that could be used in the field of medicine.

These and other objects will become apparent in the description that follows.

SUMMARY OF THE INVENTION

The method of this invention is described with reference to a scanning system as employed to screen baggage or cargo. The method could also be employed to non-scanning systems where an electronic imager is used to capture the x-ray image. The method is equally applicable for use in medicine.

In order to generate a 3D data base of the object being imaged, the method of this invention is described with reference to generating an image representation of a slice through the object. Stacking of several such slice images over the length of the object then creates a 3D data base describing the object. The generation of slice images has been described for ease of explaining the method of this invention, but is not necessary and one can reconstruct the entire or subset of the 3D volume of the object.

The method of this invention uses an Algebraic Reconstruction Technique (ART) which could be combined with the method of back projection. In accordance with this invention, the slice to be reconstructed is segmented into cells or pixels. Instead of pixels, 3D cells called voxels are also used interchangeably in the following description.

According to the method of this invention, the slice whose image is to be reconstructed, is thought of as being made up of large or coarse sized pixels, this is referred to as the first set of pixels or voxels. The signal received by each detector element is considered as a ray sum which is defined equal to the sum of the contribution of all the pixels of the slice that lie on the ray path from the x-ray source to that detector element. The summing up of the contributions of the pixels along the ray to represent the detector signal is also referred to as a line or ray integral. This sum can be computed in various ways as is well known to a person skilled in the art, but for the sake of ease of illustration, the contribution of each pixel is computed as the product of area of the ray intersecting the pixel with the density or absorption coefficient of the pixel suitably scaled. The densities of individual pixels are the unknowns in the above linear equation whereas the sum is known and is equal to the measurement made by an element of a detector. Now, if there are several detector elements arranged around the object, then a set of linear equations is obtained which are solved for the unknown densities of various pixels constituting the slice. Once the pixel densities are computed, a certain region or pixel could then be further subdivided into finer pixels to generate another set of linear equations which could be further solved. Proceeding thus, the entire area of the slice can be resolved into finer grid of pixel densities.

Once the image of the slice has been resolved into pixels of desired size, either coarse or fine, the signal received by each detector element is then back projected over the slice which is now assumed subdivided into an even finer gird, the size of each pixel about the size of each detector element. During the process of back projection, the signal assigned to each pixel of the slice is set equal to the detector signal multiplied with the earlier computed average densities of the larger pixels in the neighborhood of the smaller pixel where the back-projected density is being computed.

In alternative embodiments of the invention, two and three x-ray sources are used to generate larger number of linearly independent set of equations to be solved and thereby yielding finer resolution.

In an alternate embodiment of the invention, Algebraic methods need not be used for computing the densities f(i) of the coarse or first set of pixels. Instead, the backprojected contribution to a particular pixel is computed from all the detector elements associated with all the x-ray sources used. The backprojected densities may or may not be scaled so that the forward projected signal from the pixels to the detector elements is made equal to the detected signal. This type of a scheme may be sufficient for certain applications where high resolution is not needed and speed is the criteria.

Once an image of a slice has been reconstructed, contiguous areas of equal densities are mapped out to define object boundaries to further process the image. Further, using dual energy x-rays, as is well known to a person skilled in the art, density and atomic number of each pixel or voxel can be calculated which are then used to make a determination of if an explosive is present or not.

These and several other embodiments, objects and advantages will be apparent to one skilled in the art. The description herein should be considered illustrative only and not limiting or restricting the scope of invention, the scope being indicated by the claims.

DETAILED DESCRIPTION OF THE PREFERRED EMBODIMENTS

In describing the preferred embodiment and its alternatives, specific terminology will be used for the sake of clarity. However, the invention is not limited to the specific terms so used, and it should be understood that each specific term includes all its technical equivalents which operate in a similar manner to accomplish similar purpose.

The method of this invention is described with reference to a scanning system as employed to screen baggage or cargo. The method could also be employed to non-scanning systems where a 2D detection element is used to capture the x-ray image. The method is equally applicable for use in medicine.

In order to generate a 3D data base of the object being imaged, the method of this invention is described with reference to generating an image representation of a slice through the object. Stacking of several such slice images over the length of the object then creates a 3D data base describing the object. The generation of slice images has been described for ease of explaining the method of this invention, but is not necessary and one can reconstruct the entire or subset of the 3D volume of the object.

In order to focus attention on the core elements of this invention, the ordinary details of a x-ray scanning system used for baggage screening have been omitted from the figures and the following description as these are well known to a person skilled in the art.

Figure 1:
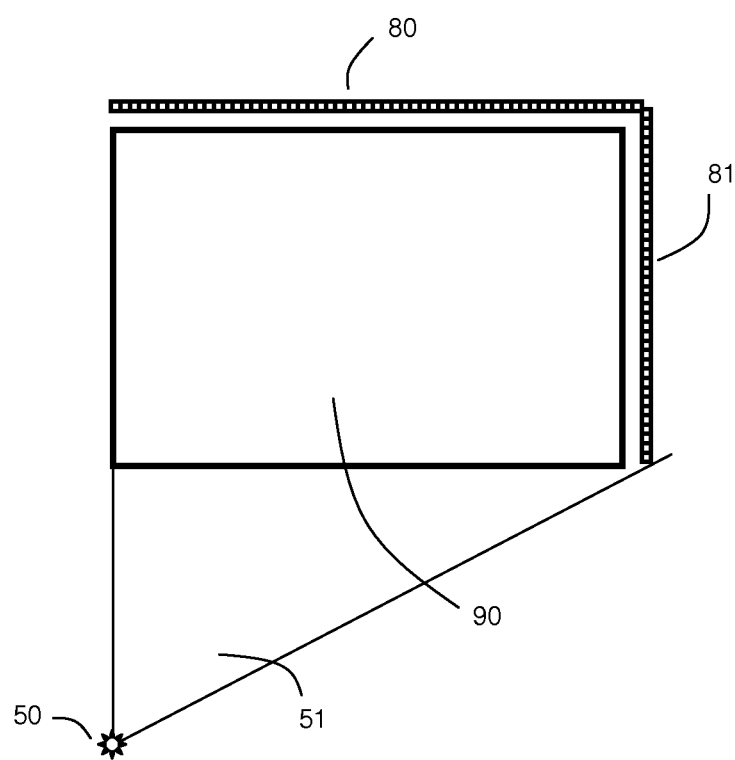
FIG. 1 shows a cross sectional view of a x-ray scanning system showing the source 50, the tunnel 90 and a large number of detector elements 80 and 81 arranged in "L" shape.

FIG. 1 shows the cross section of one embodiment of this invention. This cross section is similar to that of ordinary x-ray scanners widely used and hence no detailed description is provided here. Shown is a single x-ray source or a first radiation source 50 emitting a first radiation beam 51 which is fan shaped and is directed towards a tunnel 90 through which the object or baggage under inspection is moved. This radiation beam after traveling through the tunnel reaches the first set of detector elements or detector pixels indicated by 80 and 81, these are shown arranged in "L" shape over the far two sides of the tunnel as shown in the figure.

The following description illustrates how the image of slice through the tunnel can be reconstructed. Generating such slice images that are closely spaced then leads to a 3D representation of the object being scanned. It should be noted that it is not necessary to reconstruct an image of a slice, it could be instead of any region of interest of a volume either localized or equal to the entire volume of the object.

Figure 2:
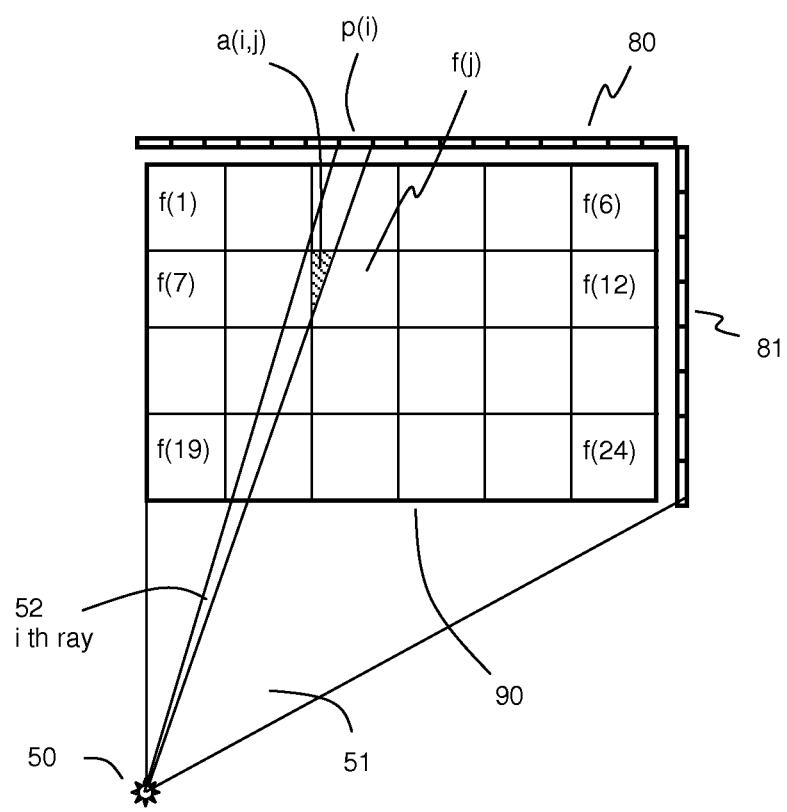
FIG. 2 shows the tunnel 90 subdivided into a coarse set of pixels or voxels with densities f(j), j=1 through 24; the smaller detector elements comprising 80 and 81 have been grouped together into larger detector elements, one such element detects a projection p(i) due to the incident ray 52.

For the purpose of reconstruction, the cross section of a tunnel is assumed to be divided into a grid or a first set of pixels as shown in FIG. 2. These pixels in reality have a third dimension too and are then referred to as a voxels. However, for the purposes of this discussion, voxels and pixels are used interchangeably and therefore will be referred to collectively as either the first set of voxels or the first set of pixels. For the sake of simplicity, only a subdivision of 6×4 or 24 pixels have been shown, but a larger or smaller number of pixels could have been chosen. It is assumed that the density profile f(j) of the cross section or the slice is to be computed to generate a 3D representation of the object. Instead of the density, it could be the absorption coefficient or some other parameter of interest that could be computed. However for the sake of the illustrating the methodology of this invention, the density will be used as the parameter of interest that needs to be computed.

According to the technique of this invention, it is assumed that the density within each pixel is uniform and is denoted by f(j) for pixel "j", the value of j ranging from 1 through 24 in FIG. 2. It should be noted that f(j) for all values of j constitute a first set of variables associated with the first set of pixels, further, these are unknown and need to be computed.

A typical baggage x-ray scanner uses several hundred to approximately a thousand detector elements or detector pixels arranged in linear arrays 80 and 81. In accordance with the scheme of FIG. 2, these detector elements are grouped into 24 groups. So if there are a total of 1024 detector elements in arrays 80 and 81, then dividing them into 24 groups means that each group should have 1024/24=42.667 detector pixels or elements. To keep the computations simple, each group can be thought of as composed of 42 elements, that is the fractional part is dropped off though it is not necessary to do so. Also, each group may not have identical number of elements, for example one group may have 42 and the next one 43 and so on. The groups need not be contiguous either, there can be a gaps between them too. Shown in FIG. 2 are these groups of elements, the size of each group is then much bigger than the size of the original detector element of FIG. 1. The signals received by the various detector elements are summed up to generate a composite detector signal which is also referred to as the projection signal, p(i) as indicated in FIG. 2.

As is well known to a person skilled in the art, the projection signal, also referred to simply the detector signal or the detected signal or just the signal in this description, is representative of the sum of the densities of the material lying in the path of the incident ray 52 shown in FIG. 2. With reference to FIG. 2, the intersection of the "i" th ray 52 with the "j" th pixel is shown as a shaded area denoted a(i,j). If the density of the "j" th pixel is denoted f(j), then as is well know to a person skilled in the art, the contribution of the "j" th pixel to p(i) is then given as the product, a(i,j)*f(j). Summing up over all the pixels, the signal p(i) is then given as, $$p(i) = \sum_j a(i,j)^* f(j) \quad (1)$$

where the summation is over j for values 1 through 24 with reference to FIG. 2. As is well known to a person skilled in the art, logarithm of the signal detected by the detector should be used for p(i) on the left hand side of above equation, however for simplicity of writing and illustration of the main principles of the technique, the logarithm operation has been omitted. In addition, also omitted are any scaling parameters which are known and constant are assumed embedded in p(i) or a(i,j). The above representation of the detected signal, p(i) is also referred to as the ray sum since it is represented as the sum of pixels lying along the path of or intersecting the ray incident on the detector. In the above equation, p(i) is a measurement at the detector and is therefore a known quantity, a(i,j) is also known as it is computed from the geometries shown in FIG. 2 as the area of the overlap or the intersection of the pixel j with the ray incident on detector element p(i). Since a(i,j) is known and constant for each pixel, it could be referred to as the weighting constant. The only unknowns or the variables are f(j) and with reference to FIG. 2, there are 24 unknowns, f(1), f(2) ... f(24). Since this set of variables is associated with the first set of voxels or pixels, these variables will also be referred to as the first set of variables. If the equation 1 above is now written for all the ray sums corresponding to all the 24 detector elements of FIG. 2, then we have 24 equations in which p(i) are the detector measurements that are known, so are the weighting constants a(i,j). These equations can be solved to obtain the values of the 24 unknown variables f(i). Equation 1 can be rewritten for all the ray sums corresponding to all the 24 detector elements as, $$a(1,1)^* f(1) + a(1,2)^* f(2) + \ldots a(1,24)^* f(24) = p(1) \quad (2)$$
$$a(2,1)^* f(1) + a(2,2)^* f(2) + \ldots a(2,24)^* f(24) = p(2)$$
$$a(3,1)^* f(1) + a(3,2)^* f(2) + \ldots a(3,24)^* f(24) = p(3)$$
$$\vdots$$
$$a(24,1)^* f(1) + a(24,2)^* f(2) + \ldots a(24,24)^* f(24) = p(24)$$

For small number of unknowns, for example 24 in this case, the solution of linear equations with matrix methods can be achieved in a simple way as is well known to a person skilled in the art. For larger matrices, there are several iterative and Algebraic methods available. In the field of Image reconstructions, the iterative methods are known as Algebraic Reconstruction Tomography or simply ART, these methods are well known to the person skilled in the art and not described any further here. The main purpose of this description is to draw attention to the technique represented by FIG. 2 and the equations 1 and 2 for the solution of unknown densities f(j).

Following the method described above, one can thus reconstruct the image of the slice which in this case has been described to be composed of only 24 pixels. While this may be sufficient for certain situations, a higher degree of resolution may be needed in other cases. In such cases, the slice can be reconstructed over a finer grid. Therefore, if there are a total of 1024 detector elements in detector arrays 80 and 81, then a maximum of 1024 equations are available, which means the maximum number of unknowns that can be solved are 1024. Therefore the cross section of the tunnel could be divided into a grid of 32×32 (=1024) pixels, or 64×16 (=1024) pixels and so on. The computation of densities f(j) over a finer grid yields a higher resolution image. With reference to FIG. 2, it can be easily seen that for even this finer grid, the size of the pixel reconstructed is much larger than the size of the detector element, and for a 1024 element detector, the size of the pixel will be of the order of 32 times the dimension of one detector element. In other words, the slice image to be reconstructed must be over sampled by finer sized detector elements.

Figure 3:
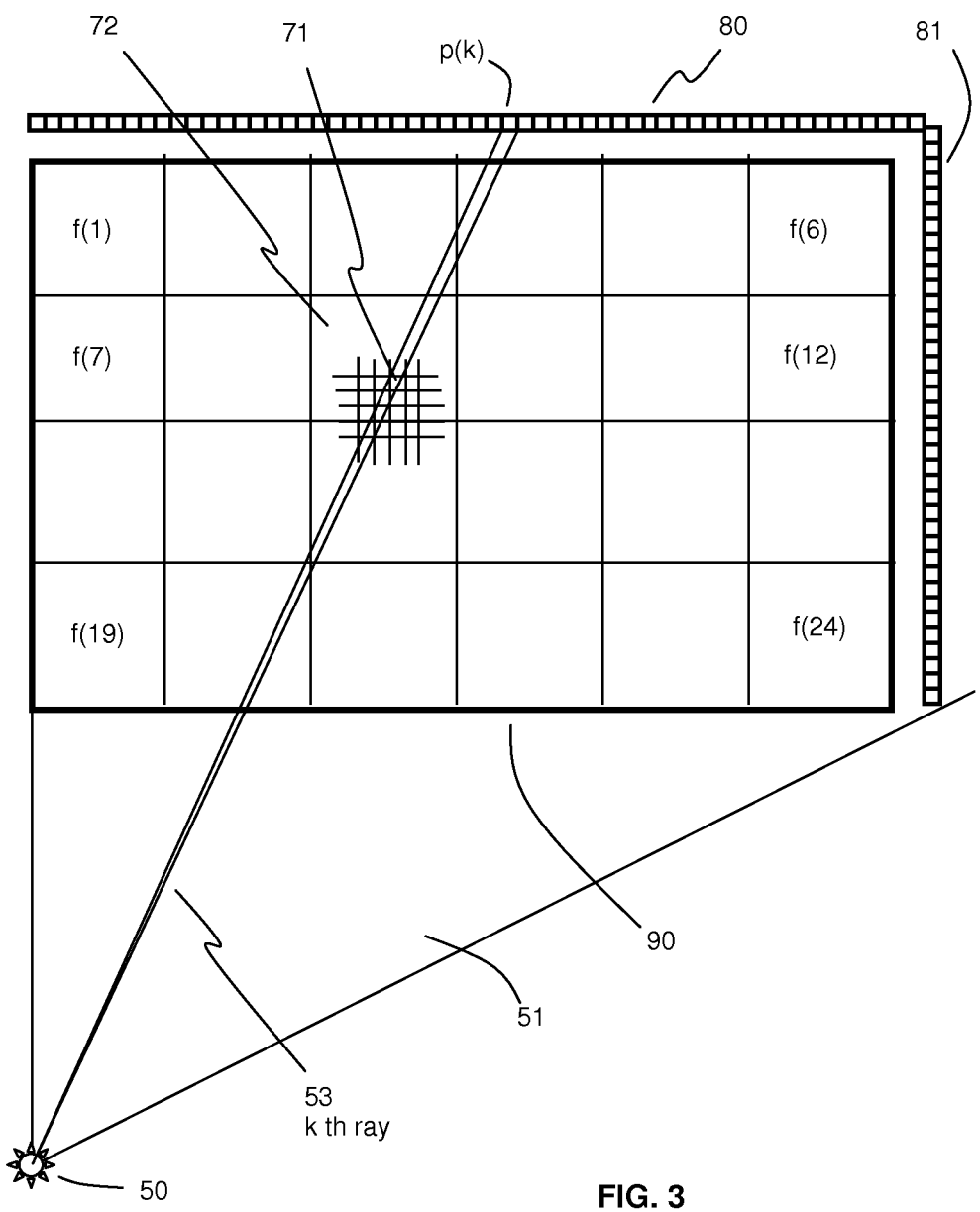
FIG. 3 shows the back projection over smaller sized pixels, it generates a higher definition image than that generated in the step shown in FIG. 2. The original small size of detector elements 80 and 81, as shown in FIG. 1, is used for back projection
Figure 4:
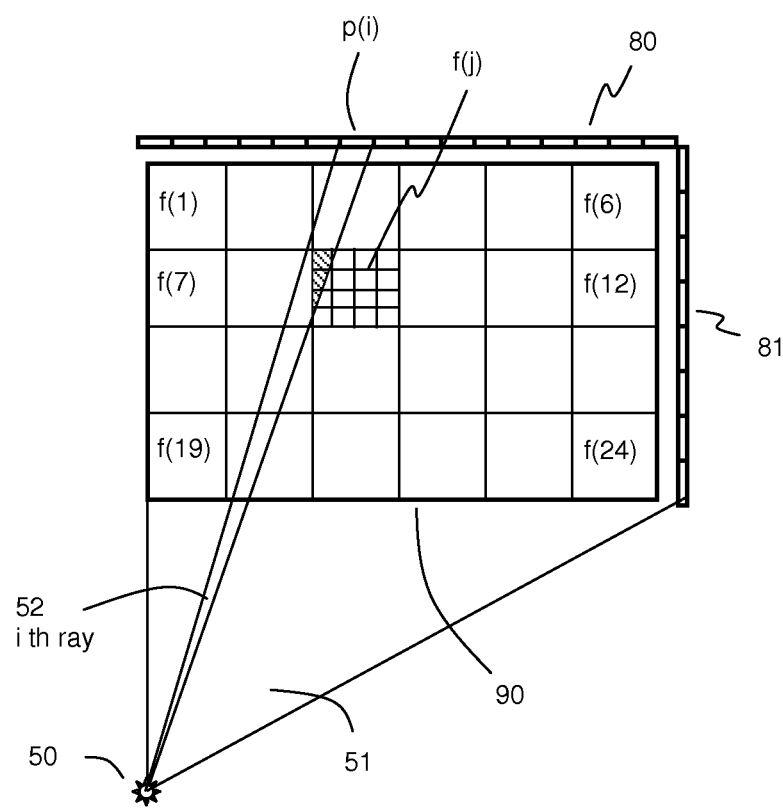
FIG. 4 shows the back projection using the larger detector groups used in the step of FIG. 2. The use of larger detector element size speeds up the process of back projection, but results in lower resolution than in FIG. 3 though higher than that of FIG. 2.

In order to build up a slice image having a resolution comparable to the dimension of the detector elements of FIG. 1, the next step in accordance with this invention employs the method of backprojection depicted in FIG. 3. Before proceeding with back projection, the detector groups of FIG. 2 are replaced by the original smaller sized detector elements of FIG. 1. Thus if there were 1024 detector elements in the system of FIG. 1, we back project from these 1024 detector elements, not from the 24 detector groups of FIG. 2, though this could be done too as shown in FIG. 4 where a very high resolution is not needed. For the purpose of back projection, a finer grid is laid over the cross section of the tunnel or the slice to be reconstructed. This fine grid may encompass the entire tunnel cross section or only over a smaller local region of interest as shown in FIG. 3. This fine grid subdivides the region of interest into a second set of pixels or voxels which are smaller in size than those in the first set of voxels whose density values, f(j) have already been computed earlier.

With reference to FIG. 3, the signal p(k) detected by detector element k is back projected over the "k" th ray shown. The signal back projected onto the smaller pixel 71 in FIG. 3 is computed as the product of area of the small pixel 71 overlapping the area of the "k" th ray multiplied by p(k), further multiplied with the average density f(i) of the larger pixel 72 computed in the earlier step using coarse or large sized pixels, and further multiplied with some normalizing number that is constant for the "k" th ray being back projected. The concept of back projection is very well known to a person skilled in the art of computer reconstruction and Tomography, and hence will not be detailed here.

It should be noted that instead of multiplying the back-projected signal by f(i) of the larger pixel 72, a weighted average of the pixel 72 and its neighboring pixels could have been used where the weight could be in proportion to the distance of smaller pixel 71 to the centers of the larger neighboring pixels. Thus the backprojection to each pixel or voxel of second set would be proportional to the values of variables associated with neighborhood voxels belonging to the first set of voxels It should be noted that if the average densities f(i) had not been computed according to the earlier step of this invention as depicted in FIG. 2, the back projection of FIG. 3 would have smeared the value p(k) uniformly in proportion to the area of intersection of pixels and the ray 53. However, with the method defined above for this invention, the back projection is not uniform, but multiplied or weighted by the average densities f(j) of the larger pixels calculated in the earlier step of FIG. 2. Following this approach, one thus reconstructs the depth or the 3D information from an over sampled 2D data using fine sized detector elements.

It should be noted that according to the method of this invention, just a single 1D image or projection can be used to generate a 3D information describing a slice through the object. In order to improve the resolution of the 3D reconstruction, second or more sources can be used.

Figure 5:
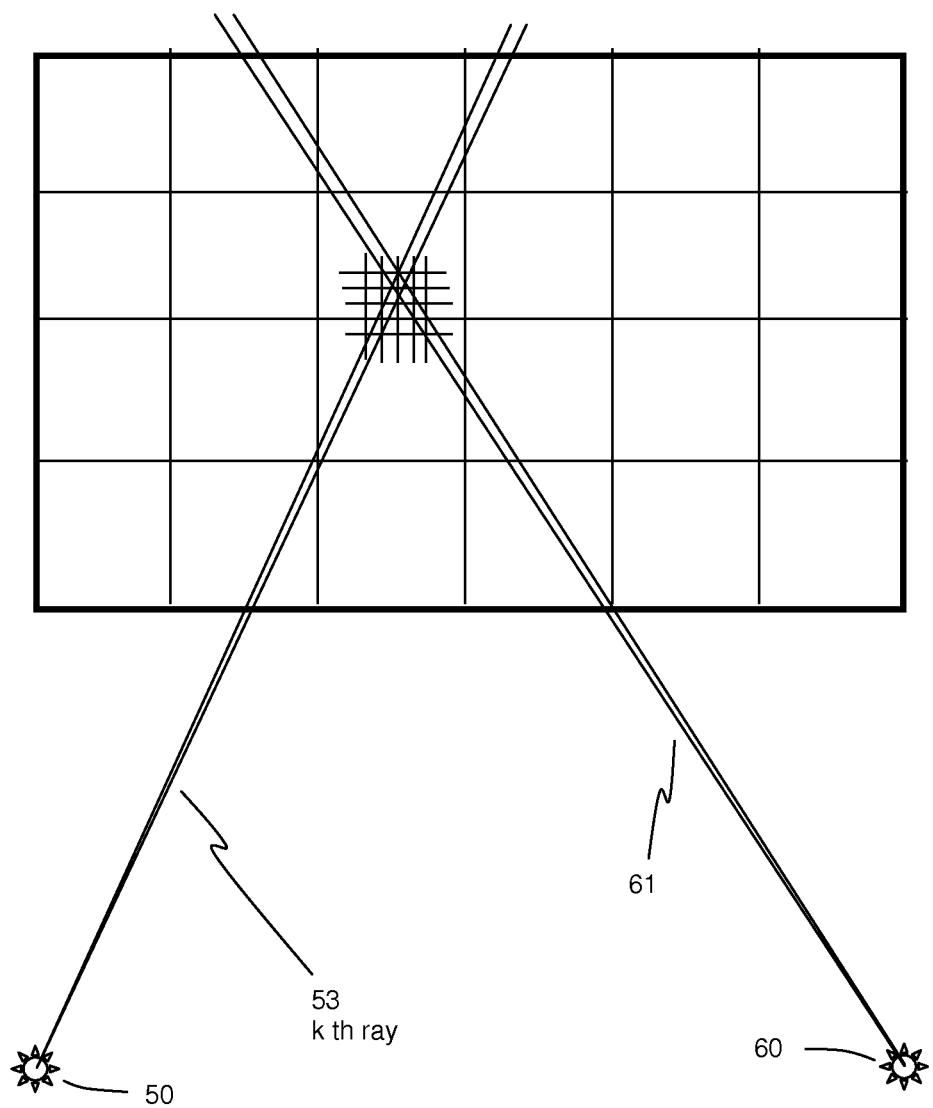
FIG. 5 shows the use of two x-ray sources to produce much higher resolution images than obtainable with a single source.

Shown in FIG. 5 is the use of second source of radiation, the x-ray source 60. This second source emits a second radiation that is oriented such that the angle it makes to the radiation from the first source is approximately a right angle or is some suitable large angle. Further this second radiation is also directed towards the object and it is detected by a second set of detector elements. Not shown in FIG. 5 is this second set of detectors and other ordinary details well known to a person skilled in the art. The use of second source would result in double the number of projections p(i) or double the number of equations in equation 2, and hence the slice can be subdivided into twice the number of pixels yielding higher resolution. Further back projecting from the second source in addition to the first source leads to a generation of an even higher resolution image.

Figure 6:
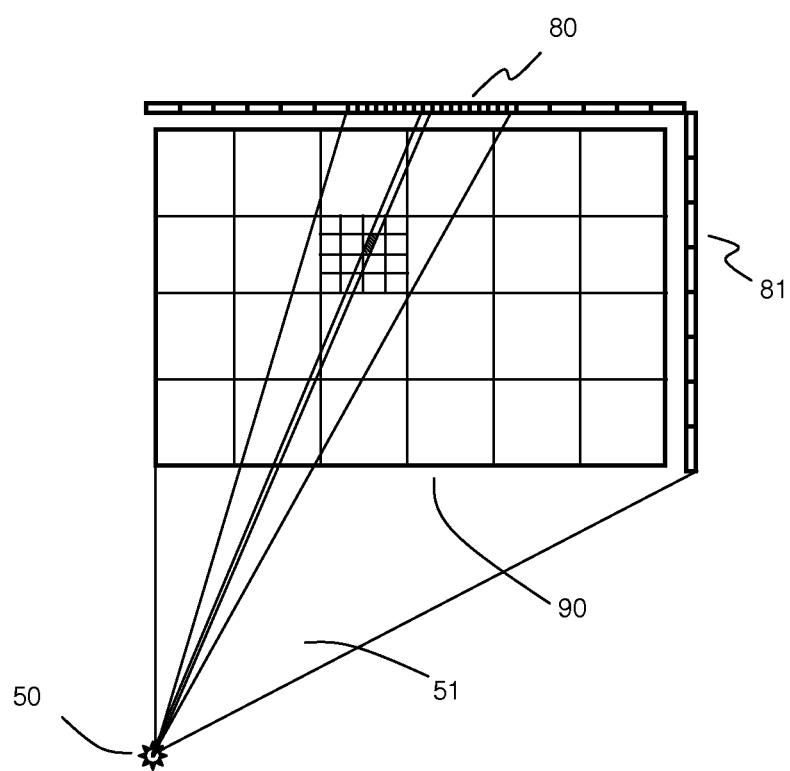
FIG. 6 is representative of two alternate embodiments of this invention. In the first alternate embodiment, it replaces the scheme of FIG. 2. In the second alternate embodiment, it is used after the step of FIG. 2 to further zoom in a certain localized region to generate higher definition image.

FIG. 6 is representative of two alternate embodiments of this invention. In the first alternate embodiment, it replaces the scheme of FIG. 2, that is unequal size of detector groups, and unequal size of pixels are used to compute the average densities f(i) as already explained with reference to FIG. 2 and equations 1 and 2. In the second alternate embodiment, the scheme of FIG. 6 is used after the slice image has already been computed with uniform pixel size shown in FIG. 2. Thus the scheme of FIG. 6 would be used as a second phase to further zoom in a certain localized region to generate higher definition image. In this second phase, the densities of the larger pixels is now considered as known as it has already been computed, the only unknowns are the densities of the smaller grid with fine size pixels. These unknown density values corresponding to the second set of voxels is referred to as the second set of variables. These unknowns or variables can be solved by the scheme of FIG. 6 where additional simultaneous equations are generated by using fine sized detector elements spanning the projection of the localized region that needs to be resolved into finer pixels or higher resolution.

Figure 7:
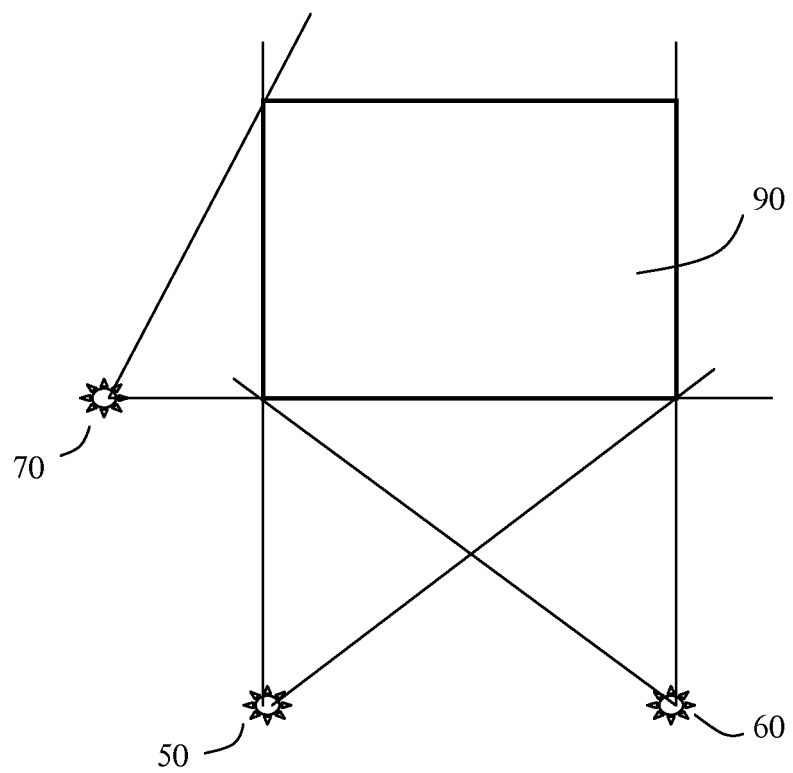
FIG. 7 shows an alternate embodiment using three x-ray sources for generating higher definition images.

In another embodiment of this invention, a third x-ray source is used as shown in FIG. 7. It is not necessary to locate the sources exactly as indicated in the figures of this invention. Further, more sources and at different locations can be used.

Figure 8:
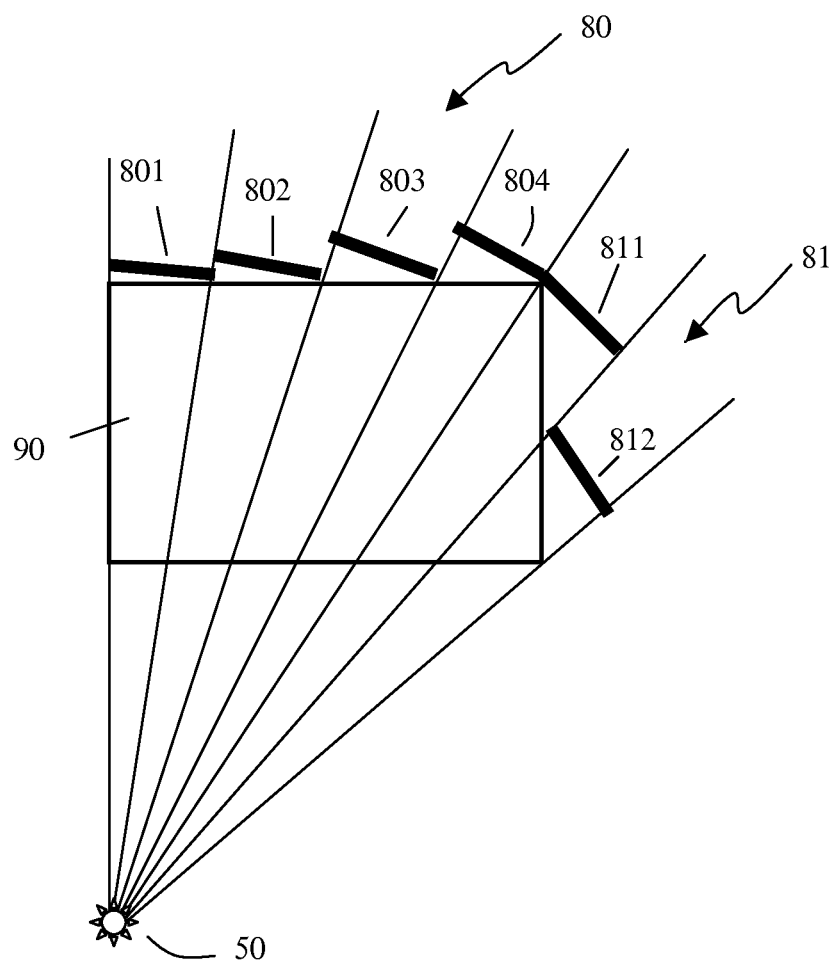
FIG. 8 shows the detail of detectors 80 and 81 commonly used.

FIG. 8 shows the details of the detectors 80 and 81. Breaking up the "L" shaped detector arms into smaller groups of elements allows the detectors to be oriented more orthogonally to the radiation thereby increasing the detection sensitivity.

Once an image of a slice has been reconstructed, contiguous areas of equal densities are mapped out to define object boundaries to further process the image. Further, using dual energy x-rays, as is well known to a person skilled in the art, density and atomic number of each pixel or voxel can be calculated which are then used to make a determination if an explosive or contraband is present or not.

It should be noted that the method of this invention in its preferred embodiment has been described as a two step process. The first step computes the average densities of the slice over large sized coarse pixels. The second step involves back projecting the detector signal over smaller or finer sized pixels to generate higher resolution image. In some situations, it may not be necessary to implement the second step where the resolution of the first step suffices.

It should be further noted that the second step of back projection could be an iterative process when two or more x-ray sources are used. In such a case the back projected signal is then forward projected and compared with the signal received by the detector elements. The difference between the two is then back projected over the ray path to iterate the density values according to various iterative methods known in the literature.

It should be noted that it is not necessary to generate an image of a slice, instead an image of any region can be computed, it could be the entire volume or a localized volume of the object under inspection that could be reconstructed in the step one of this invention. Instead of using one row of detectors, several rows of detectors could be used, further, the detectors need not even be placed in rows. The main idea behind the technique is to generate a set of simultaneous equations with the number of unknowns being equal to the number of pixels or voxels over which the image reconstruction is desired.

It should be noted that while the use of x-rays have been described to explain the method of this invention, but this method is equally applicable to gamma rays or any other penetrating radiation system that gets attenuated as it passes through a material.

It should be noted that while the method of invention has been described with reference to scanning for security applications, it is equally applicable in the field of medicine to generate 3D images. Here instead of using linear arrays of detector 80 or 81, large planar detectors commonly employed in medicinal x-ray imaging can be used. X-ray images taken from 1, 2, 3 or more angles could be combined in accordance with the method of this invention to generate 3D images.

The foregoing description of the invention and its embodiments should be considered as illustrative only of the concept and principles of the invention. The invention may be configured in a variety of ways, shapes and sizes and is not limited to the description above. Numerous applications of the present invention will readily occur to those skilled in the art. Therefore, it is desired that the scope of the present invention not be limited by the description above but by the claims presented herein.

The invention claimed is:

1. A method of using an apparatus comprising of at least a first radiation source, a first set of detector elements and a computing means to compute a 3D profile of a parameter of interest of an object comprising the steps of:

using said first radiation source to generate a first radiation;

positioning said first set of detector elements so as to detect said first radiation;

interposing said object in between said first radiation source and said first set of detector elements;

defining a region of interest of said object as a first set of voxels having a size that is large relative to the size of elements of said first set of detector elements, further the number of voxels in said first set of voxels is less than or equal to the number of elements of said first set of detector elements;

denoting the value of said parameter of interest within each said voxel by a variable and thereby generating a first set of variables associated with said first set of voxels;

representing the signal detected by each element of said first set of detector elements as a ray sum that has contributions from all the voxels of said first set of voxels that intersect with the ray path connecting said first radiation source and said each element of said first set of detector elements; and using said computing means for computing the 3D profile over said region of interest of said object by performing computations on the ray sums which are defined equal to the detected signals from said first set of detector elements and solving for the values of said first set of variables associated with said first set of voxels.

2. The method of claim 1 further comprising the steps of:
defining a second set of voxels that are smaller in size than said first set of voxels, this second set of voxels being defined over a region of interest within said object where finer resolution is needed than that denoted by said first set of voxels;
backprojecting from said first set of detector elements over said second set of voxels that intersect with the ray paths from said first set of detector elements to said first source of radiation, and further the backprojection to each voxel of said second set of voxels being made proportional to the values of said first set of variables associated with neighborhood voxels belonging to said first set of voxels.

3. The method of claim 1 further comprising the steps of:
defining a second set of voxels that are smaller in size than said first set of voxels, this second set of voxels being defined over a localized region of interest within said object where finer resolution is needed than that denoted by said first set of voxels;
associating to each voxel of said second set of voxels a variable representing said parameter of interest of object and thereby generating a second set of variables;
representing the object outside the said localized region of interest by coarser sized first set of voxels; and
performing further computations on said ray sums denoted by detected signals from said first set of detector elements to solve for the values of said second set of variables associated with said second set of voxels over said region of interest of said object.

4. The method of claim 1 further comprising the steps of:
using a second source of radiation generating a second radiation;
orienting said second radiation such that the angle it makes to said first radiation is approximately a right angle or is some suitable large angle, further, said second radiation is oriented such that it is also incident on said object;
positioning a second set of detector elements oriented so as to detect said second radiation after it has been intercepted by said object; and
using the signal detected by said second set of detectors in conjunction with that detected by said first set of detectors to solve for said first set of variables representing said first set of voxels within said object.

5. The method of claim 4 further comprising the steps of:
defining a second set of voxels that are smaller in size than said first set of voxels, this second set of voxels being defined over a region of interest within said object where finer resolution is needed than that denoted by said first set of voxels; and
backprojecting from said first set of detector elements along ray paths from said first set of detector elements to said first source of radiation, backprojecting from said second set of detector elements along ray paths from said second set of detector elements to said second source of radiation, and further the backprojection to each voxel of second set is made proportional to the values of variables associated with neighborhood voxels of said first set of voxels.

6. The method of claim 4 further comprising the steps of:
defining a second set of voxels that are smaller in size than said first set of voxels, this second set of voxels being defined over a localized region of interest within said object where finer resolution is needed than that denoted by said first set of voxels;
associating to each voxel of said second set of voxels a variable representing said parameter of interest of object and thereby generating a second set of variables;
representing the object outside the said localized region of interest by coarser sized first set of voxels; and
performing further computations on said ray sums denoted by detected signals from said first set and said second set of detector elements to solve for the values of said second set of variables associated with said second set of voxels over said region of interest of said object.

\* \* \* \* \*